US012670044B2

(12) United States Patent  
Zahra et al.

(10) Patent No.: US 12,670,044 B2  
(45) Date of Patent: Jun. 30, 2026

(54) METHOD OF CONTEXTUAL ANNOTATION BASED ON THIRD-PARTY APPLICATION PROGRAMMING INTERFACES

(71) Applicant: Spekit Inc., Denver, CO (US)

(72) Inventors: Zarnigar Zahra, Karachi (PK); Hammad Fauz Akhwand, Islamabad (PK); Najam Ahmed Ansari, Karachi (PK); Melanie Gene Fellay, Nassau (BS)

( * ) Notice: Subject to any disclaimer, the term of this patent is extended or adjusted under 35 U.S.C. 154(b) by 362 days.

(21) Appl. No.: 18/243,469

(22) Filed: Sep. 7, 2023

(65) Prior Publication Data

US 2024/0086266 A1 Mar. 14, 2024

Related U.S. Application Data

(60) Provisional application No. 63/404,595, filed on Sep. 8, 2022.

(51) Int. Cl.  
   *G06F 12/00*      (2006.01)  
   *G06F 9/54*       (2006.01)  
   *G06F 40/14*      (2020.01)  
   *G06F 40/169*     (2020.01)

(52) U.S. Cl.  
   CPC .............. *G06F 9/547* (2013.01); *G06F 40/14* (2020.01); *G06F 40/169* (2020.01)

(58) Field of Classification Search  
   CPC ........ G06F 9/547; G06F 40/14; G06F 40/169; G06F 16/957; G06F 40/143  
   See application file for complete search history.

(56) References Cited

U.S. PATENT DOCUMENTS

| | | | |
|---|---|---|---|
| 2013/0031454 A1* | 1/2013 | Griffiths | G06F 40/169 |
| | | | 715/230 |
| 2017/0344227 A1* | 11/2017 | Stoicov | H04L 41/22 |
| 2022/0138266 A1* | 5/2022 | Wang | G06N 3/044 |
| | | | 707/722 |

\* cited by examiner

*Primary Examiner* — Shawn X Gu

(57) ABSTRACT

Techniques are described for contextual annotation based on third party application programming interfaces. In an embodiment, metadata that represents a configuration of an organization-specific instance of a web application and comprising a plurality of objects pertaining to the configuration is received. The URL of a resource of the web-based application, i.e. the URL of a web page, is parsed to determine a particular object that is associated with the resource. The resource associated with the URL and the received metadata are used to determine text element(s) from the resource that correspond to one or more fields of the particular object. Annotation code is injected into the resource that is associated with the URL of the web-based application. A web page is displayed that includes a graphical display of the text element(s) annotated with selectable icons that correspond to the annotation code.

16 Claims, 6 Drawing Sheets

FIG. 2

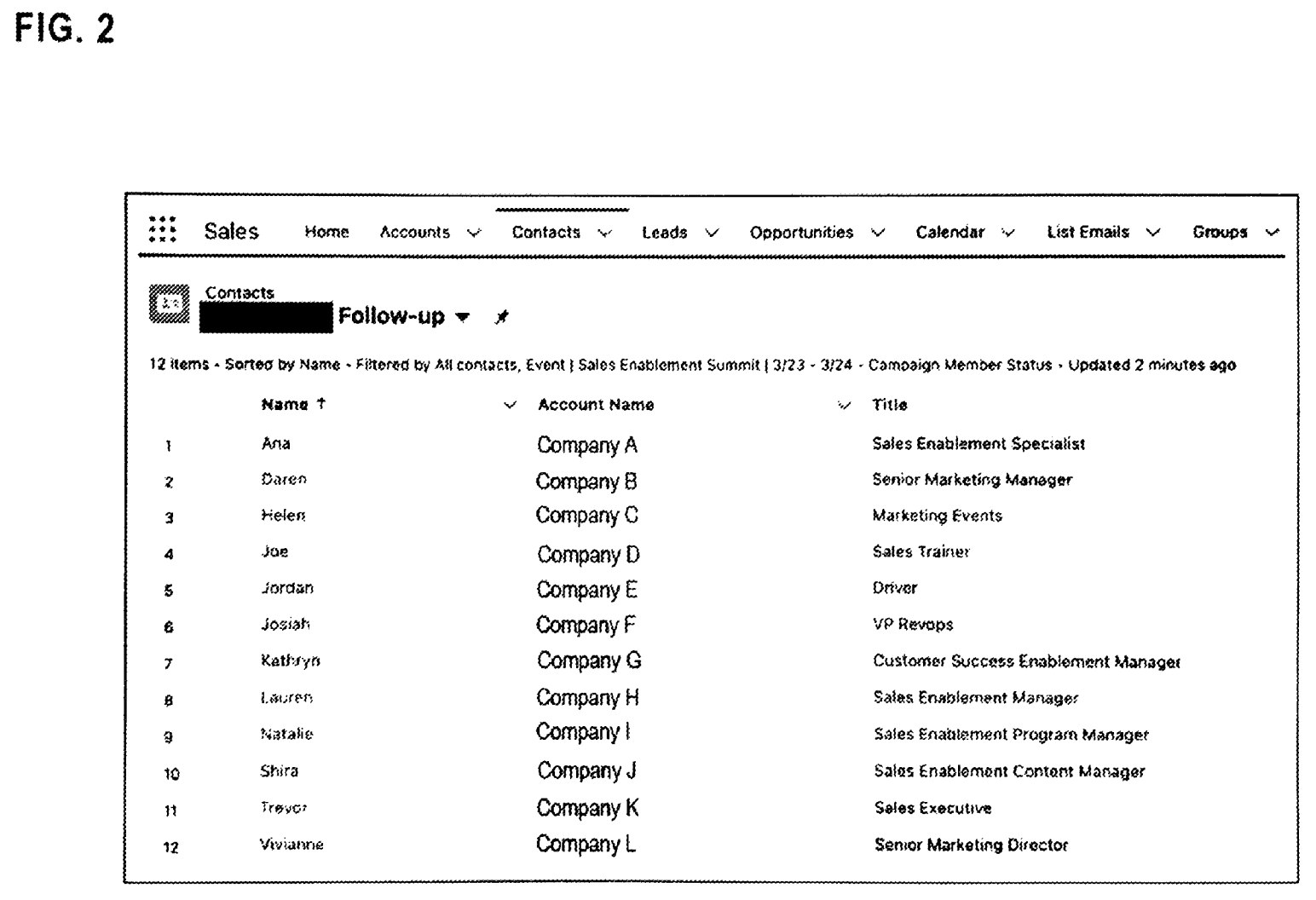

Sales    Home    Accounts ⌄    Contacts ⌄    Leads ⌄    Opportunities ⌄    Calendar ⌄    List Emails ⌄    Groups ⌄

Contacts

Follow-up ▼ ✦

12 items • Sorted by Name • Filtered by All contacts, Event | Sales Enablement Summit | 3/23 - 3/24 • Campaign Member Status • Updated 2 minutes ago

| | Name ↑ | | Account Name | | Title |
|---|---|---|---|---|---|
| 1 | Ana | | Company A | | Sales Enablement Specialist |
| 2 | Daren | | Company B | | Senior Marketing Manager |
| 3 | Helen | | Company C | | Marketing Events |
| 4 | Joe | | Company D | | Sales Trainer |
| 5 | Jordan | | Company E | | Driver |
| 6 | Josiah | | Company F | | VP Revops |
| 7 | Kathryn | | Company G | | Customer Success Enablement Manager |
| 8 | Lauren | | Company H | | Sales Enablement Manager |
| 9 | Natalie | | Company I | | Sales Enablement Program Manager |
| 10 | Shira | | Company J | | Sales Enablement Content Manager |
| 11 | Trevor | | Company K | | Sales Executive |
| 12 | Vivianne | | Company L | | Senior Marketing Director |

FIG. 5

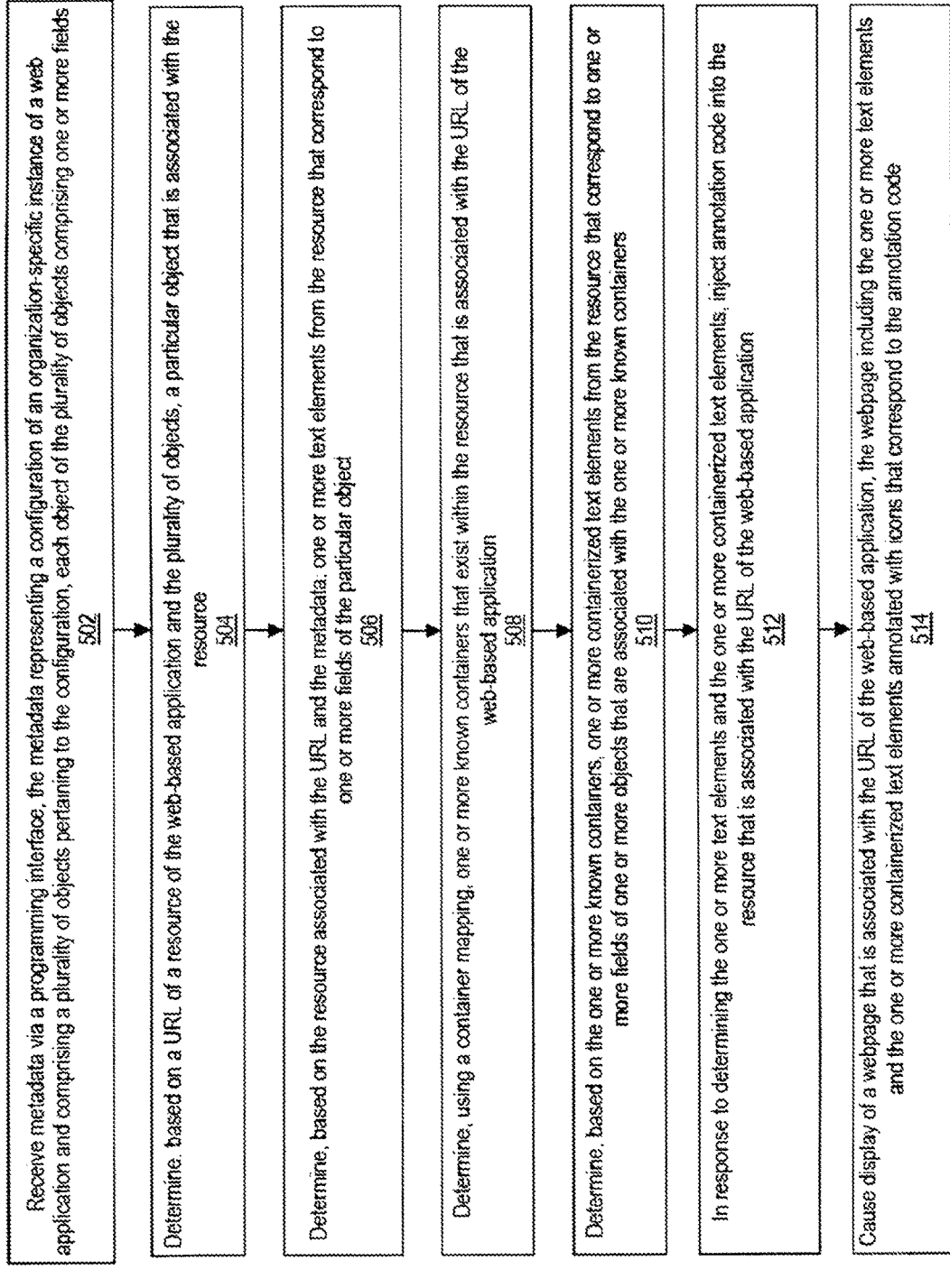

Receive metadata via a programming interface, the metadata representing a configuration of an organization-specific instance of a web application and comprising a plurality of objects pertaining to the configuration, each object of the plurality of objects comprising one or more fields
502

Determine, based on a URL of a resource of the web-based application and the plurality of objects, a particular object that is associated with the resource
504

Determine, based on the resource associated with the URL and the metadata: one or more text elements from the resource that correspond to one or more fields of the particular object
506

Determine, using a container mapping, one or more known containers that exist within the resource that is associated with the URL of the web-based application
508

Determine, based on the one or more known containers, one or more containerized text elements from the resource that correspond to one or more fields of one or more objects that are associated with the one or more known containers
510

In response to determining the one or more text elements and the one or more containerized text elements, inject annotation code into the resource that is associated with the URL of the web-based application
512

Cause display of a webpage that is associated with the URL of the web-based application, the webpage including the one or more text elements and the one or more containerized text elements annotated with icons that correspond to the annotation code
514

METHOD OF CONTEXTUAL ANNOTATION BASED ON THIRD-PARTY APPLICATION PROGRAMMING INTERFACES

BENEFIT CLAIM

This application claims the benefit under 35 U.S.C. § 119(e) of provisional application 63/404,595, filed Sep. 8, 2022, the entire disclosure of which is hereby incorporated by reference for all purposes as if fully set forth herein.

FIELD OF THE DISCLOSURE

One technical field of the present disclosure is automatic annotation of computer-implemented graphical user interfaces. Yet another technical field is computer-implemented application programming interfaces.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A web application is a software application which is accessible using a web browser. Generally, web applications include interactive elements which allow users to manipulate data and are often provided using cloud computing services. A web application typically includes multiple web pages that exist within the web application, where each web page is dedicated to one or more different topics. As an example, a web application may comprise a customer relationship management (CRM) system, such as the Salesforce CRM system or Outreach CRM system.

Browser extensions can be installed in a web browser and utilized to enhance or supplement existing web pages, such as the web pages within a web application. Some examples of enhancements to a web page that browser extensions may provide include increasing the size of a font on a web page, injecting new icons, links, or images into a web page, or changing the color of the background of a web page.

In the case where the intention of a browser extension is to supplement or annotate elements of a web page with additional information, numerous technical problems exist. A threshold problem is identifying elements within a web page so that such elements can be consistently tracked and enhanced by a browser extension as the web page and web browser change over time. This problem is often solved by hard coding the browser extension to look for certain page elements in specific sections of a web page.

However, during the life cycle of a web application, the composition of web pages that exist within the web application may change. Content and features that exist with a web page may be added, removed, or modified. Additionally, the user experience (UX) may change, resulting in changes to the source code of the web page. Such changes often lead to inconsistencies in browser extension functionality where the browser extension seeks to enhance or supplement a web page.

For example, consider a browser extension that is configured to inject a hyperlink adjacent to a specific selection of text in a specific header section of a web page. If the text or structure of the underlying web page changes, the browser extension may not recognize the change and will fail to produce the intended result of injecting the hyperlink at the intended position within the web page. Computer-implemented techniques are desired to facilitate dynamic adaptation to changes in web pages.

SUMMARY

The appended claims may serve as a summary of the invention.

BRIEF DESCRIPTION OF THE DRAWINGS

FIG. 2 shows a graphical user interface display of a web page that is associated with an object and fields.

FIG. 5 illustrates a flow chart of an example flow diagram of an example process in accordance with an embodiment of the disclosure; and FIG. 6 is a block diagram of a computer system upon which the techniques described herein may be implemented.

DESCRIPTION OF EXAMPLE EMBODIMENTS

Figure 1:
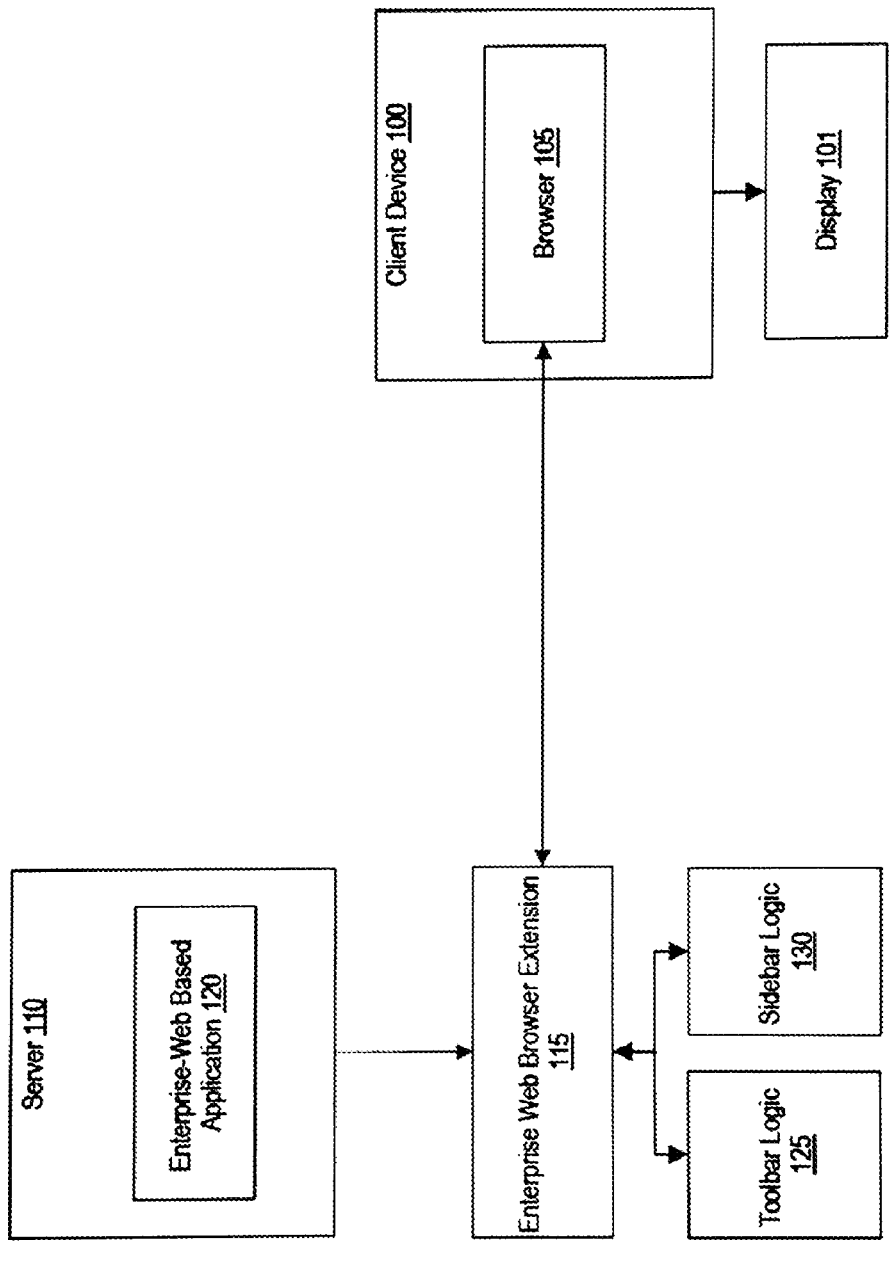
FIG. 1 illustrates a block diagram of an example computer system architecture in accordance with an embodiment of the disclosure.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

1. OVERVIEW
    2. EXAMPLE COMPUTER SYSTEM IMPLEMENTA-TION
    3. METADATA API
    4. CREATING METADATA DEFINITIONS
    5. FIELD AND ELEMENT MATCHING
    6. EMBEDDED OBJECT MATCHING
    7. ELEMENT ANNOTATION
    8. EXAMPLE FUNCTIONAL IMPLEMENTATION
    9. HARDWARE OVERVIEW
    10. OTHER ASPECTS OF DISCLOSURE

Overview

Systems and methods are provided for contextual annotation based on third party application programming interfaces. Metadata is received via a programming interface. The metadata represents a configuration of an organization-specific instance of a web application and comprises objects, each object including one or more fields pertaining to the configuration. The URL of a resource of the web-based application, i.e. the URL of a web page, is parsed to determine a particular object that is associated with the resource. The resource associated with the URL and the received metadata are used to determine text element(s) from the resource that correspond to one or more fields of the particular object. A container mapping that identifies known containers and associates such containers with specific objects from the received metadata is used as a basis for determining known container(s) that exist within the resource that is associated with the URL of the web-based application. Based on the known container(s), containerized text element(s) from the resource are determined. The containerized text element(s) correspond to one or more fields of object(s) that are associated with the known container(s). Once the text element(s) and the containerized text element(s) are determined, annotation code is injected into the resource that is associated with the URL of the web-based application. Aa web page is displayed that is associated with the URL of the web-based application. The web page includes a graphical display of the text element(s) and the containerized text element(s) annotated with icons that correspond to the annotation code.

Given that metadata received through the programming interface describes the structure of web pages within a web application, such metadata can be used as a source of truth for elements that may exist within certain web pages of the web application. Thus, even if an element of a web page is modified or if the structure of the web page is changed, the algorithm for annotation based on the received metadata can accurately identify elements throughout the web page and properly inject annotation code to provide accurate, robust, and dynamic annotation. The techniques discussed herein provide an improved form of annotation that is based on third party APIs that provide information regarding the structure of a web page. By using the metadata received from a programming interface as a basis for annotation, elements of a web page can accurately and consistently be annotated, even as a web page or underlying web platform is modified over time, providing a superior user experience to users.

Example Computer System Implementation

A web browser (commonly referred to as a browser) is a software application for retrieving, presenting, and traversing information resources on the World Wide Web. A resource is identified by a Uniform Resource Identifier (URI/URL) and may be source code that represents part of a web page, source code that represents an entire web-page, an image, a video, or any other piece of content. Hyperlinks present in resources enable users easily to navigate their browsers to related resources. Although browsers are primarily intended to use the World Wide Web, they can also be used to access information provided by web servers in private networks or files in file systems. The primary purpose of a web browser is to bring information resources to the user ("retrieval" or "fetching"), allowing them to view the information ("display", "rendering"), and then access other information ("navigation", "following links"). Currently the major web browsers are known as Firefox, Internet Explorer, Google Chrome, Opera, and Safari.

The process begins when the user inputs a Uniform Resource Locator (URL), for example 'http://en.wikipedia.org/', into the browser. The prefix of the URL, the Uniform Resource Identifier or URI, determines how the URL will be interpreted. The most commonly used kind of URI starts with http: and identifies a resource to be retrieved over the Hypertext Transfer Protocol (HTTP). Many browsers also support a variety of other prefixes, such as https: for HTTPS, ftp: for the File Transfer Protocol, and file: for local files. Prefixes that the web browser cannot directly handle are often handed off to another application entirely. For example, mailto: URIs are usually passed to the user's default emailwq2 application, and news: URIs are passed to the user's default newsgroup reader. In the case of http, https, file, and others, once the resource has been retrieved the web browser will display it. Source code including HTML and associated content (image files, formatting information such as CSS, etc.) is passed to the browser's layout engine to be transformed from markup to an interactive document, a process known as "rendering". Aside from HTML, web browsers can generally display any kind of content that can be part of a web page. Most browsers can display images, audio, video, and XML files, and often have plug-ins to support Flash applications and Java applets. Upon encountering a file of an unsupported type or a file that is set up to be downloaded rather than displayed, the browser prompts the user to save the file to disk. Information resources may contain hyperlinks to other information resources. Each link contains the URI of a resource to go to. When a link is clicked, the browser navigates to the resource indicated by the link's target URI, and the process of bringing content to the user begins again. The architecture of a web browser is described in the publication entitled: "Architecture and evolution of the modern web browser" by Alan Grosskurth and Michael W. Godfrey of the University of Waterloo in Canada, dated Jun. 20, 2006, which is incorporated in its entirety for all purposes as if fully set forth herein.

A currently popular web browser is the Internet Explorer (formerly Microsoft Internet Explorer and Windows Internet Explorer, commonly abbreviated IE or MSIE) from Microsoft Corporation, headquartered in Redmond, Wash., U.S.A., which is a series of graphical web browsers developed by Microsoft and included as part of the Microsoft Windows line of operating systems. The Internet Explorer 8 is described, for example, in Microsoft 2009 publication entitled: "Step by Step Tutorials for Microsoft Internet Explorer 8 Accessibility Options", which is incorporated in its entirety for all purposes as if fully set forth herein. Another popular web browser is the Google Chrome which is a freeware web browser developed by Google, headquartered in Googleplex, Mountain View, Calif., U.S.A. Google Chrome aims to be secure, fast, simple, and stable, providing strong application performance and JavaScript processing speed.

A browser extension is a computer program that extends the functionality of a web browser in some way. Extensions can be created through use of web technologies such as HTML, JavaScript, and CSS. Browser extensions can also improve the user interface of the web browser without directly affecting viewable content of a web page, which can be achieved through a variety of add ons such as toolbars and plug-ins. Microsoft Internet Explorer started supporting extensions from version 5 released in 1999. Mozilla Firefox has supported extensions since its launch in 2004. The Opera desktop web browser supported extensions from version 10 released in 2009. Google Chrome started supporting extensions from version 4 released in 2010. The Apple Safari web browser started supporting native extensions from version 5 released in 2010. The syntax for extensions may differ from browser to browser, or at least enough different that an extension working on a browser may or may not work on another one.

A browser extension can add productivity tools, which are viewed as augmentations, so the tools and a user's browser can work with selected web sites, web services, or selected third party applications to improve customer productivity. In one embodiment, the present browser extension provides a toolbar/sidebar combination that can improve user productivity.

FIG. 1 illustrates an example networked computer system with which various implementations may be practiced. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of how to dynamically adapt to changes in webpages and web browsers with contextual annotation and application programming interfaces. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIG. 1 is shown in simplified, schematic format for purposes of illustrating a clear example and other implementations may include more, fewer, or different elements. FIG. 1 comprises various entities and devices which may be used to practice an implementation. In FIG. 1, a client-server block diagram is shown of a client device 100 (e.g. computing device) including a display screen 101, and having a web browser 105 for communicating over a network connection to locate and access websites. The web browser 105 includes a graphical user interface and can display web page content received from a web site on the display screen 101.

From the server-side, when a user visits a website, the server 110 delivers web pages with functionality inherent in the web pages but also a layer is added, being a browser extension 115. For example, a customized browser extension 115 including toolbar logic 125 and sidebar logic 130 can be transmitted and/or downloaded to the client device 100. The extension 115 provides code that creates and displays a toolbar and/or sidebar that become part of the browser 105. Tools provided by the sidebar can improve the interface with the enterprise-based web application 120 and thus can improve productivity. An enterprise-based web application 120 is a software application which is accessible using a web browser. Generally, web applications include interactive elements which allow users to manipulate data and are often provided using cloud computing techniques. A web application may comprise a customer relationship management (CRM) system, such as the Salesforce CRM system, Outreach CRM system or similar.

The browser extension 115 is software code (or other forms of logic) that extends the capability and functionality of the browser 105 once installed in the browser 105 (or installed to function with the browser 105). For example, the extension 115 becomes resident software code in the browser rather than being part of a web page (e.g. extension is not part of web page content that is downloaded and displayed). As such, the browser extension 115 can be selectively installed into or uninstalled from the browser 105. Furthermore since the extension 115 may be designed for the enterprise application 120 of the website, the extension 115 provides the client browser 105 with an improved interface with the website. The extension 115 augments the user's web browser 105 with a new functionality that it did not possess so that users can be more productive when interacting with the enterprise application 120.

Once the extension 115 is installed, it becomes part of the browser 105 and is ready to function when the browser 105 is launched. As summarized previously, in one embodiment the extension creates a toolbar and sidebar combination that is resident in the browser but separate from the web pages and provides for the display of multiple content panes that can communicate with enterprise applications.

In one embodiment, the browser extension 115 includes toolbar logic 125 that is configured to create and display a toolbar with one or more icons on the display screen 101 of the client device 100. An icon can be configured to initiate an associated command (e.g. open/close a window, open/close a menu, initiate a task, etc.).

The browser extension 115 also includes sidebar logic 130 that is configured to perform a number of features. For example, it can communicate with a remote web service (e.g. from the enterprise application 120) to determine a group of sidebar content to display on a display screen based on a rule, and communicate with the remote web service to retrieve the group of sidebar content. The sidebar logic 130 can also display a group of sidebar windows on the display screen 101 based on the retrieved group of sidebar content. In one example, the retrieved sidebar content can include one or more different types of content and the sidebar logic 130 is configured to display a different sidebar window for containing each different type of content. Thus, a particular type of sidebar content would be displayed in an associated sidebar window that is designated for the particular type of content.

For example, if the retrieved sidebar content includes "news" content, then a "news" sidebar window would be displayed to contain the "news" content. If no "news" content was received, then the "news" sidebar window would not be displayed. Thus, the sidebar logic can dynamically determine what type of sidebar windows are needed based on the types of sidebar content received. In one embodiment, the types of sidebar content received can be based on a user profile that designates user-specific content for particular users.

The sidebar logic 130 can also configure one or more of the sidebar windows to communicate to one or more remote web services from the enterprise application 120 based on the sidebar content displayed therein. Using the previous example of the "news" sidebar window, communications can be established with a particular remote web service that retrieves and updates "news" content and transmits the content to the sidebar window. Other communications can also be established for retrieving other types of content from other web services.

The browser extension 115 may also include additional logic that is configured to interact with different programming interfaces such as the Document Object Model (DOM) API of a web page. A DOM is the data representation of the objects that comprise the structure and content of a document on a web page. The DOM represents a web page so that programs such as the browser extension 115 can change the web page structure, style, and content. In one embodiment, the DOM represents a web page as nodes and objects so that various programming languages can easily interact with the DOM. For example, as an object-oriented representation of a web page, the web page can be modified with a scripting language such as JavaScript.

It will be appreciated that in one embodiment the browser extension 115 is embodied as processor readable instructions on a computer-readable medium. Also, particular software code, instructions or functionality associated with the toolbar logic 125 and the sidebar logic 130 can be combined or separated as desired. They are described as separate elements herein for ease of explanation.

Any of the components of FIG. 1 and associated architecture may include alternate and/or additional hardware, software, or firmware components beyond those described or depicted without departing from the scope of the disclosure. For example, hardware, software, or firmware components depicted or described as forming part of any of the illustrative components of FIG. 1, and the associated functionality that such components support, are merely illustrative and that some components may not be present or additional components may be provided in various embodiments. While various program modules have been depicted and described with respect to various illustrative components of FIG. 1, the functionality described as being supported by the program modules may be enabled by any combination of hardware, software, and/or firmware. Each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. The functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as submodules of another module, in certain embodiments, such modules may be provided as independent modules.

FIG. 1 is one example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system of FIG. 1, or additional functionality.

Metadata API

A metadata application programming interface (API) provides access to metadata that represents a configuration of an organization-specific instance of a web application.

Metadata received from a metadata API describes or represents a configuration of an organization-specific instance of a web application, including the schema, process, presentation, and authorization. Metadata can be distinguished from business data in that business data includes data records that directly correspond to an organization such as a specific address, account, or product. Metadata may include objects which may comprise one or more fields that define the object.

For example, the object "Accounts" includes schema metadata and business data. Account fields such as Account Name, City, and Zip Code, are all schema metadata. The corresponding field values in each field, such as Spekit, Chicago, IL, and 60106, are all business data. Together, the Accounts object and Accounts fields describe a basic configuration of an instance of a web application.

As discussed with respect to FIG. 1, a web application may comprise a customer relationship management (CRM) system, such as the Salesforce CRM system or Outreach CRM system. Such web applications may be customized by an organization creating custom metadata objects and fields and/or modifying preset metadata objects and fields within their respective instance of the web application, i.e. an "organization-specific instance" of a web application. Web applications may provide access to a metadata API from which metadata can be periodically retrieved and stored. For example, a metadata API may be queried to retrieve a file representation of the metadata components, including objects and corresponding fields, of an organization specific-instance of a web application.

In addition to identifying the presence of certain objects and fields, the retrieved metadata describes how web pages of a web application are structured. FIG. 2 shows a graphical user interface display of a web page that is associated with the "Contacts" object and the "Name", "Account Name', and "Title" fields of the "Contacts" object.

As shown with respect to FIG. 2, the "Contacts" object corresponds to the topic of the page as highlighted in the top margin and is represented in the body of the web page by a "Contacts" table. The "Name", "Account Name', and "Title" fields each correspond to different columns within the "Contacts" table. Because the metadata received from a metadata API describes the structure of web pages within a web application, the metadata can be used as a map to identify and locate elements that may exist within certain web pages of the web application. If an element within a web page is modified or moves places, the metadata can be used in combination with other techniques to dynamically track elements within a web page and provide consistent enhancements using a browser extension, as further discussed herein.

Creating Metadata Definitions

Once metadata is received, metadata definition data can be created and stored in association with the received metadata. Metadata definition data provides information about fields or objects included in metadata. For example, for the metadata object "Accounts" that includes the fields "Account Name", "City", and "Zip Code", a user can create metadata definition data for each field. For the "Account Name" field, a user may provide metadata definition data that specifies that an "Account Name" should be the name of the Account Department/Team and a few examples of proper "Account Name" field values. Metadata definition data can be mapped to each corresponding field of each object from the metadata and stored in a metadata definition mapping.

Field and Element Matching

Once metadata is received, the metadata can be used to dynamically and accurately determine the composition of a resource within a web application. Being able to dynamically and accurately determine the composition of a resource is a key aspect of being able to provide enhancements to a resource, as further discussed herein.

First, when a user navigates to a URL within a web application, the URL can be used as a basis for determining a particular object from the received metadata that is associated with the resource. For example, the browser extension 115 may parse the following URL from the Salesforce CRM into multiple text elements: "https://spekit.lightning.force-.com/lightning/o/Contact/list". Once parsed, the browser extension 115 includes instructions to identify that the parsed URL includes the text element "Contact" that matches the "Contact" object from the received metadata.

Second, once the browser extension 115 determines the particular object from the received metadata that is associated with the URL, the browser extension 115 parses or scans the resource that is associated with the URL for text elements from the resource that correspond to one or more fields of the particular object. The scanning or parsing of text elements in the resource may be performed using any applicable technique, such as by querying text elements identified in the resource against the received metadata that is stored in a remote database.

Continuing the example from above, for the URL: "https://spekit.lightning.force.com/lightning/o/Contact/list", the browser extension 115 scans the associated resource, such as the HTML source code, for text elements that match the one or more fields of the "Contact" object from the received metadata. Example text elements from the HTML source code that correspond to the one or more fields of the particular object may include "Account Name", "Title", "Phone".

Once the text elements have been determined, the browser extension 115 can inject code that will provide consistent enhancements to the web page, as further discussed herein.

Embedded Object Matching

Modern web pages are often structured using HTML. Web page source code written in HTML is often divided into containers using container tags. The "<div>" tag is a generic container tag that can be used to divide HTML source code into identifiable sections. A container can be labeled with a container ID so that each container can be distinguished from other containers. For example, the following code snippet includes multiple containers:

<div id="article">
       <div id="content">Here's the blog post content</div>
       <div id="footer">Thank you for reading!</div>
    </div>

The first container is represented by id="article" and spans the entire code snippet. The second container is represented by id="content" and includes the text "Here's the blog post content". The third container is represented by id="footer" and includes the text "Thank you for reading!". Many other container tags may exist, such as Hyperlink <a> tag, Header tags from <h1> to <h6>, Paragraph <p> tag, etc.

In general, the purpose of containers is so that an HTML document structure is easy to maintain and modify, and so that styling languages such as CSS can be easily applied to a web page.

As discussed above in the sections titled "METADATA API" and "FIELD AND ELEMENT MATCHING", metadata can be received that describes a structure of a web page. The URL of a web page can be parsed to determine an object from the received metadata that the web page represents. In the case where a particular web page primarily represents a particular object from the received metadata but includes one or more other objects from the received metadata that are embedded in the particular web page, further processing of the web page may be necessary before the browser extension 115 attempts to enhance the web page.

A container mapping can be created and stored that identifies known containers and associates such containers with specific objects from the received metadata. For example, a container mapping may include a data record that maps a container with the ID: "contacts_container" to the object "Contacts" from the received metadata.

In addition to the browser extension 115 scanning the resource that is associated with the URL for text elements that correspond to one or more fields of the particular object, the browser extension 115 may additionally scan the resource that is associated with the URL for known containers that exist in the container mapping. Once the browser extension 115 scans a web page and identifies a particular container from the container mapping that is mapped to a specific object, the browser extension 115 scans the data within the container for containerized text elements within the container that correspond to one or more fields of the specific object.

For example, if the browser extension 115 identifies a container from the container mapping titled "contacts_container" that is mapped to the "Contacts" object within a particular web page, the browser extension 115 then scans the data within the container to identify any text elements that match one or more fields that are associated with the "Contacts" object. During the element annotation process, containerized text elements, i.e. text elements that are identified within known containers, will be annotated separately from text elements that are not associated with known containers, as further discussed herein.

Element Annotation

Once text elements have been identified within a resource, including any containerized text elements, such text elements can be used as a basis for annotation. Text elements can be annotated by injecting annotation code into a resource that is associated with a URL of a web-based application. In one embodiment, text elements can be annotated by the browser extension 115 communicating with the DOM API for the selected web page. The DOM API provides methods to inject annotation code that may comprise links, images, text or other content into the existing display of a web page.

Figure 3:
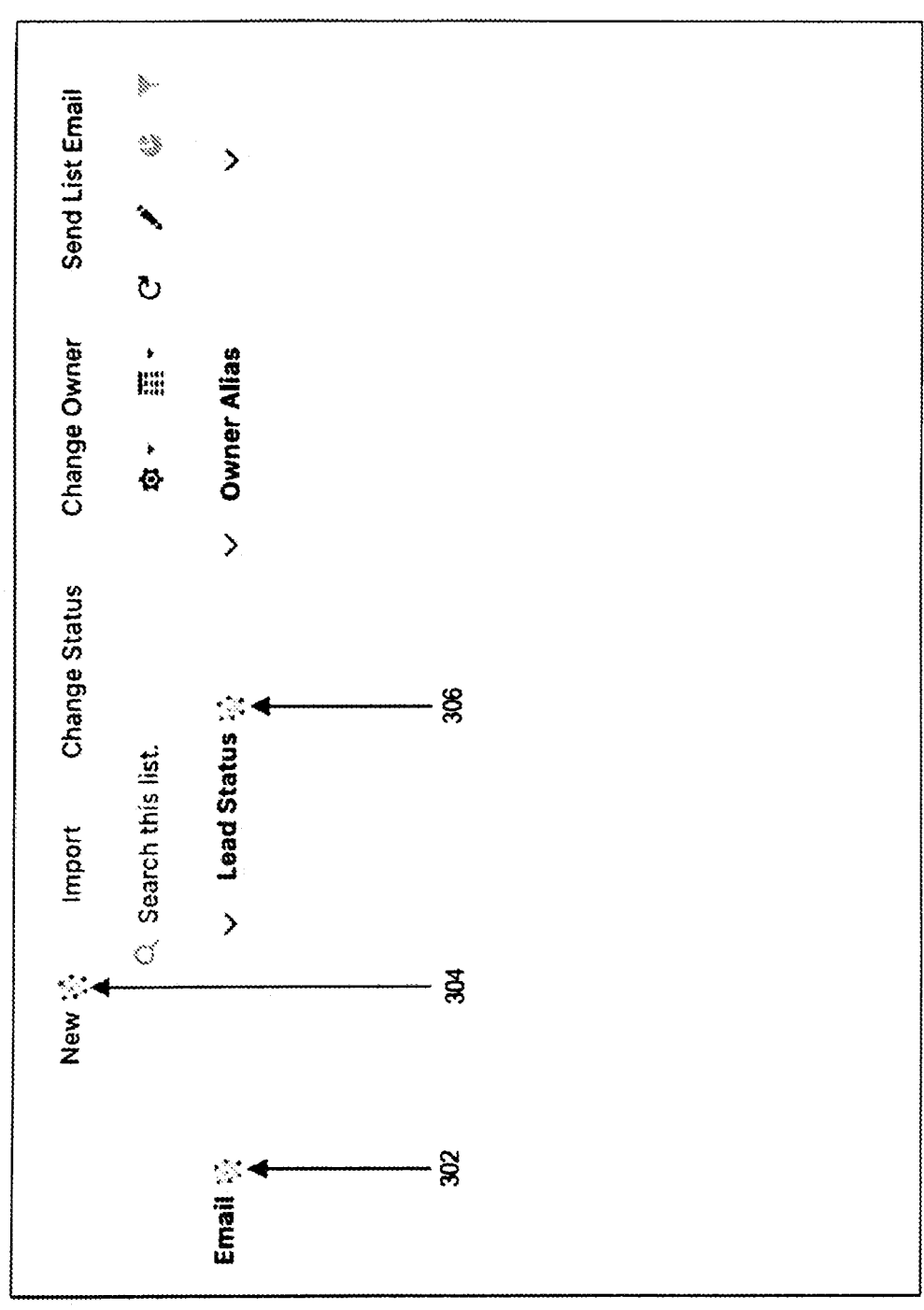
FIG. 3 shows a graphical user interface display that includes text elements and corresponding annotation icons.

For example, if the browser extension 115 identifies that the text elements "Email", "Lead Status", and "New" are identified within a resource, the browser extension 115 can communicate with the DOM API for the selected resource to add graphical annotations to the resource. FIG. 3 shows a graphical user interface that includes text elements and corresponding annotation icons. As shown in FIG. 3, each of the text elements "Email", "New", and "Leadstatus" are annotated with an annotation icon, 302, 304, 306, respectively, that indicates that each respective text element is associated with metadata definition data for a field that corresponds to each respective text element.

Figure 4:
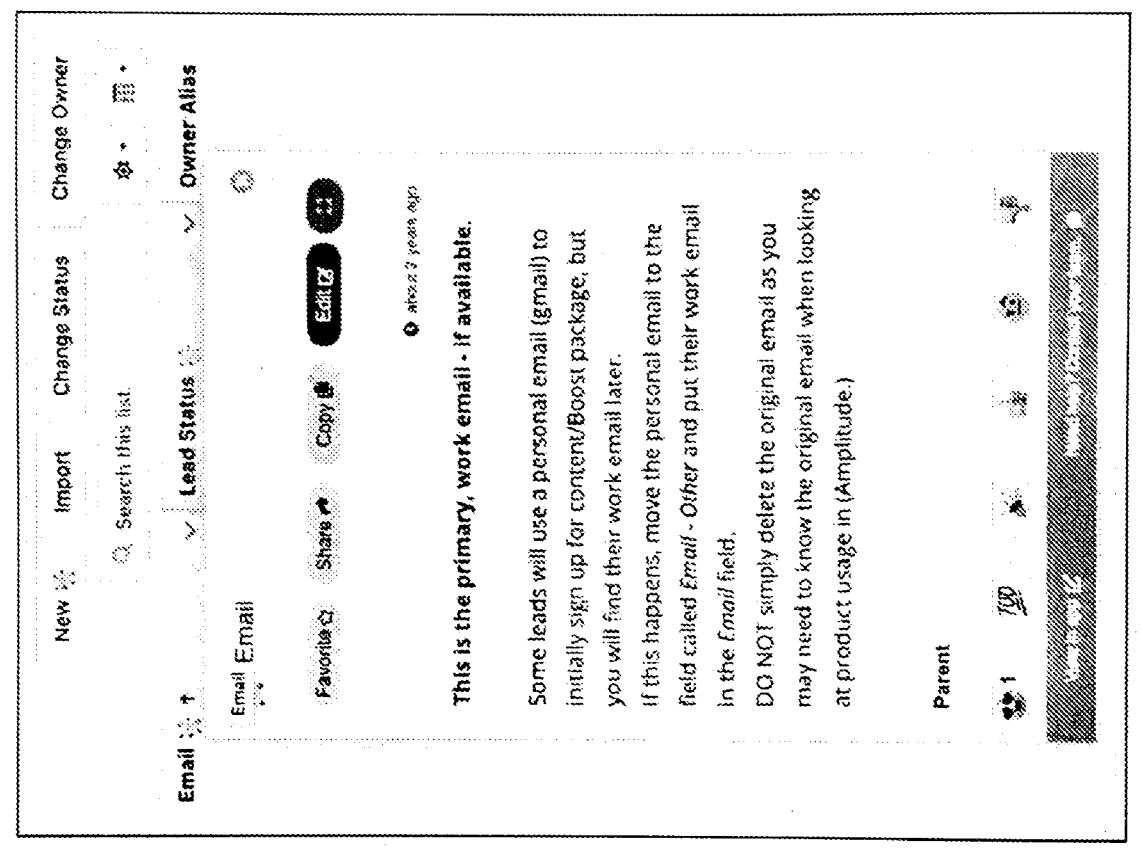
FIG. 4 shows a graphical user interface display of the selection of an annotation icon.

FIG. 4 shows a graphical user interface display of the selection of an annotation icon. For example, as shown in FIG. 4, when the annotation icon next to the "Email" text element is selected, such as when clicked on or hovered over by a cursor, a window is displayed that provides metadata definition data for the "Email" field in a structured format.

Example Functional Implementation

FIG. 5 shows an example flowchart of a method for contextual annotation based on third-party application programming interfaces, according to an embodiment.

Although the steps in FIG. 5 are shown in one example order, the steps of FIG. 5 may be performed in any order and are not limited to the order shown in FIG. 5. Additionally, some steps may be optional, may be performed multiple times, or may be performed by different components. All steps, operations, and functions of a flow diagram that are described herein are intended to indicate operations that are performed using programming in a special-purpose computer or general-purpose computer, in various embodiments. Each flow diagram and block diagram is presented at the same level of detail that persons skilled in the applicable technical fields use to communicate with one another about plans, specifications, algorithms, and data structures as a basis for programming implementations to solve the applicable technical problems, while also applying their accumulated knowledge and skill of computer architecture, programming, and engineering techniques. Each flow diagram in this disclosure provides a guide, plan, or specification of an algorithm for programming a computer to execute the functions that are described.

In step 502, metadata is received via a programming interface. The metadata represents a configuration of an organization-specific instance of a web application and comprises a plurality of objects pertaining to the configuration, each object of the plurality of objects comprising one or more fields.

In step 504, it is determined, based on a URL of a resource of the web-based application and the plurality of objects, a particular object that is associated with the resource.

In step 506, it is determined, based on the resource associated with the URL and the metadata, one or more text elements from the resource that correspond to one or more fields of the particular object.

In step 508, it is determined, using a container mapping, one or more known containers that exist within the resource that is associated with the URL of the web-based application.

In step 510, it is determined, based on the one or more known containers, one or more containerized text elements from the resource that correspond to one or more fields of one or more objects that are associated with the one or more known containers.

In step 512, in response to determining the one or more text elements and the one or more containerized text elements, injecting annotation code into the resource that is associated with the URL of the web-based application.

In step 514, a web page is caused to be displayed that is associated with the URL of the web-based application, the webpage including the one or more text elements and the one or more containerized text elements annotated with icons that correspond to the annotation code.

Given that metadata API describes structure of web pages within a web application, the metadata can be used as a source of truth for elements that may exist within certain web pages of the web application. Thus, even if an element of a web page is modified or moves places, the algorithm for annotation can still identify elements throughout the web page and properly inject annotation code to provide accurate, robust, and dynamic annotation.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
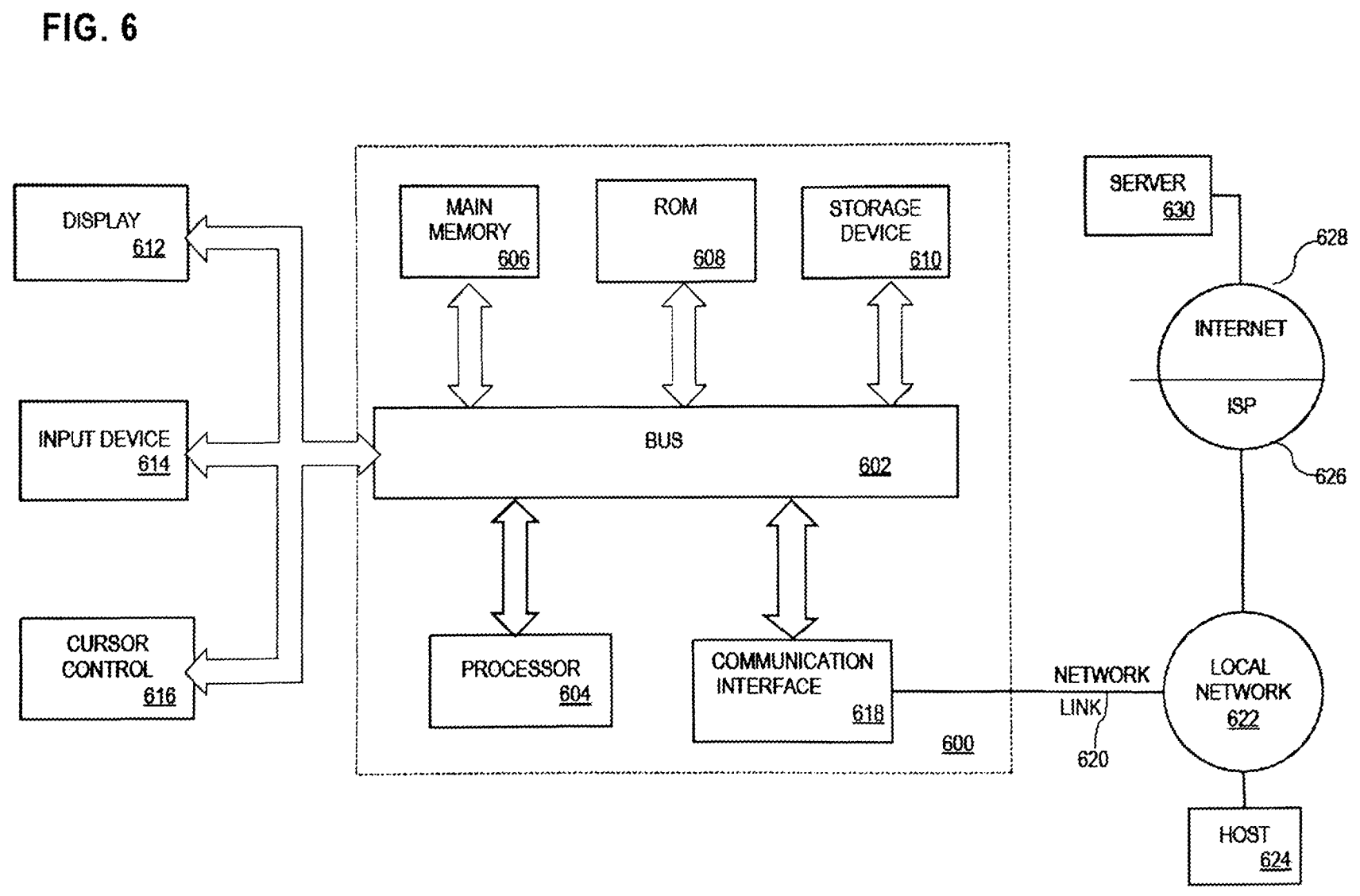

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface

618 provides a two-way data communication coupling to network link(s) 620 that are directly or indirectly connected to at least one communication networks, such as a network 622 or a public or private cloud on the Internet. For example, communication interface 618 may be an Ethernet network- ing interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, inter- network or any combination thereof. Communication inter- face 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such imple- mentation, communication interface 618 sends and receives electrical, electromagnetic or optical signals over signal paths that carry digital data streams representing various types of information.

Network link 620 typically provides electrical, electro- magnetic, or optical data communication directly or through at least one network to other data devices, using, for example, satellite, cellular, Wi-Fi, or BLUETOOTH tech- nology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is imple- mented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application pro- grams including mobile apps. The instructions may com- prise an operating system and/or system software; one or more libraries to support multimedia, programming or other functions; data protocol instructions or stacks to implement TCP/IP, HTTP or other communication protocols; file for- mat processing instructions to parse or render files coded using HTML, XML, JPEG, MPEG or PNG; user interface instructions to render or interpret commands for a graphical user interface (GUI), command-line interface or text user interface; application software such as an office suite, inter- net access applications, design and manufacturing applica- tions, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the net- work(s), network link 620 and communication interface 618. In the Internet example, a server 630 might transmit a requested code for an application program through Internet 628, ISP 626, local network 622 and communication inter- face 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions con- currently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodi- ment, switches may be performed when tasks perform input/output operations, when a task indicates that it can be switched, or on hardware interrupts. Time-sharing may be implemented to allow fast response for interactive user applications by rapidly performing context switches to pro- vide the appearance of concurrent execution of multiple processes simultaneously. In an embodiment, for security and reliability, an operating system may prevent direct communication between independent processes, providing strictly mediated and controlled inter-process communica- tion functionality.

The term "cloud computing" is generally used herein to describe a computing model which enables on-demand access to a shared pool of computing resources, such as computer networks, servers, software applications, and ser- vices, and which allows for rapid provisioning and release of resources with minimal management effort or service pro- vider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environ- ment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

OTHER ASPECTS OF DISCLOSURE

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method comprising:
   receiving, via a programming interface, metadata, the metadata representing a configuration of an organization-specific instance of a web application and comprising a plurality of objects pertaining to the configuration, each object of the plurality of objects comprising one or more fields;
   determining, based on a universal resource locator (URL) of a resource of the web application and the plurality of objects, a particular object that is associated with the resource;
   determining, based on the resource associated with the URL and the metadata, one or more text elements from the resource that correspond to one or more fields of the particular object;
   injecting annotation code into the resource that is associated with the URL of the web application, the annotation code based on the one or more text elements;
   causing display of a web page that is associated with the URL of the web application, the web page including the one or more text elements annotated with icons that correspond to the annotation code.

2. The computer-implemented method of claim 1, further comprising:
   determining, using a container mapping, one or more known containers that exist within the resource that is associated with the URL of the web application;
   determining, based on the one or more known containers, one or more containerized text elements from the resource that correspond to one or more fields of one or more objects that are associated with the one or more known containers;
   wherein the annotation code that is injected into the resource that is associated with the URL of the web application is further based on the one or more containerized text elements;
   wherein the display of the web page that is associated with the URL of the web application includes the one or more containerized text elements annotated with selectable icons that correspond to the annotation code.

3. The computer-implemented method of claim 1, wherein the resource comprises source code of the web page that is associated with the URL of the web application.

4. The computer-implemented method of claim 1, wherein the web application comprises a customer relationship management system.

5. The computer-implemented method of claim 1, wherein the metadata describes a structure of one or more web pages of the web application.

6. The computer-implemented method of claim 1, wherein the injecting annotation code into the resource that is associated with the URL of the web application comprises transmitting a request to a Document Object Model (DOM) Application Programming Interface (API) of the web page that is associated with the URL of the web application.

7. The computer-implemented method of claim 1, wherein the determining, based on the resource associated with the URL and the metadata, one or more text elements from the resource that correspond to one or more fields of the particular object includes querying text elements identified in the resource against the metadata.

8. The computer-implemented method of claim 1, further comprising:

receiving a selection of selectable icons that correspond to the annotation code;

in response to the selection, causing display of a window that includes metadata definition data, the metadata definition data providing information about the one or more fields of the particular object.

9. A system comprising:

one or more processors;

one or more storage devices operatively coupled to the one or more processors;

instructions, stored on the one or more storage devices, which, when executed by the one or more processors, cause:

receiving, via a programming interface, metadata, the metadata representing a configuration of an organization-specific instance of a web application and comprising a plurality of objects pertaining to the configuration, each object of the plurality of objects comprising one or more fields;

determining, based on a URL of a resource of the web application and the plurality of objects, a particular object that is associated with the resource;

determining, based on the resource associated with the URL and the metadata, one or more text elements from the resource that correspond to one or more fields of the particular object;

injecting annotation code into the resource that is associated with the URL of the web application, the annotation code based on the one or more text elements;

causing display of a web page that is associated with the URL of the web application, the web page including the one or more text elements annotated with selectable icons that correspond to the annotation code.

10. The system of claim 9, wherein the instructions further comprise instructions, which, when executed by the one or more processors, cause:

determining, using a container mapping, one or more known containers that exist within the resource that is associated with the URL of the web application;

determining, based on the one or more known containers, one or more containerized text elements from the resource that correspond to one or more fields of one or more objects that are associated with the one or more known containers;

wherein the annotation code that is injected into the resource that is associated with the URL of the web application is further based on the one or more containerized text elements;

wherein the display of the web page that is associated with the URL of the web application includes the one or more containerized text elements annotated with icons that correspond to the annotation code.

11. The system of claim 9, wherein the resource comprises source code of the web page that is associated with the URL of the web application.

12. The system of claim 9, wherein the web application comprises a customer relationship management system.

13. The system of claim 9, wherein the metadata describes a structure of one or more web pages of the web application.

14. The system of claim 9, wherein the injecting annotation code into the resource that is associated with the URL of the web application comprises transmitting a request to a DOM API of the web page that is associated with the URL of the web application.

15. The system of claim 9, wherein the determining, based on the resource associated with the URL and the metadata, one or more text elements from the resource that correspond to one or more fields of the particular object includes querying text elements identified in the resource against the metadata.

16. The system of claim 9, wherein the instructions further comprise instructions, which, when executed by the one or more processors, cause:

receiving a selection of the selectable icons that correspond to the annotation code;

in response to the selection, causing display of a window that includes metadata definition data, the metadata definition data providing information about the one or more fields of the particular object.

* * * * *